(12) United States Patent
Murray et al.

(10) Patent No.: US 6,516,116 B1
(45) Date of Patent: Feb. 4, 2003

(54) HIGH SPEED OPTICAL RECEIVER

(75) Inventors: James T. Murray, Tucson, AZ (US); William Austin, Tucson, AZ (US)

(73) Assignee: Lite Cycles, Inc., Tucson, AZ (US)

( * ) Notice: Subject to any disclaimer, the term of this patent is extended or adjusted under 35 U.S.C. 154(b) by 85 days.

(21) Appl. No.: 09/702,252

(22) Filed: Oct. 30, 2000

(51) Int. Cl.[7] .............................................. G02B 6/26
(52) U.S. Cl. ........................................ 385/31; 250/216
(58) Field of Search ............................. 385/31.32, 147, 385/133; 250/227.11, 216, 206.2; 359/853, 867

(56) References Cited

U.S. PATENT DOCUMENTS

| | | | |
|---|---|---|---|
| 4,042,821 A | * 8/1977 | Mierzwinski | 250/216 |
| 4,760,371 A | * 7/1988 | Don | 116/34 A |
| 4,962,311 A | * 10/1990 | Poisel et al. | 250/216 |
| 5,023,440 A | * 6/1991 | Kuppenheimer, Jr. | 250/203.6 |
| 5,258,867 A | * 11/1993 | Iggulden et al. | 250/206.2 |
| 5,357,101 A | * 10/1994 | Plesko | 250/216 |
| 5,390,265 A | * 2/1995 | Jiao | 385/15 |
| 5,727,108 A | * 3/1998 | Hed | 362/576 |
| 5,764,845 A | * 6/1998 | Nagatani et al. | 385/146 |
| 5,845,024 A | * 12/1998 | Tsushima et al. | 385/33 |
| 5,967,653 A | * 10/1999 | Miller et al. | 362/558 |
| 5,971,551 A | * 10/1999 | Winston et al. | 126/683 |
| 6,272,269 B1 | * 8/2001 | Naum | 362/551 |

* cited by examiner

*Primary Examiner*—Ellen E. Kim
(74) *Attorney, Agent, or Firm*—Howard R. Popper

(57) ABSTRACT

A high speed optical receiver comprises a photonic detector having an active aperture area dimensioned to minimize capacitance effects commensurate with achieving the desired signaling speed, and a compound parabolic reflector having a surface contour described by rotating a parabolic arc about a rotational axis, the axis of said parabolic arc making an angle with the rotational axis proportional to the conical angle of the incident light to be gathered, the reflector having a plurality of focii defining the perimeter of an exit pupil not exceeding the area of said photonic detector aperture. The compound reflector contour may advantageously be formed at the end of a length of optical fiber that is positioned at the detector aperture, incident light being admitted to the other end of the fiber through a focusing element which may be a lens, mirror, or holographic phase mask.

9 Claims, 3 Drawing Sheets

HIGH SPEED OPTICAL RECEIVER

FIELD OF THE INVENTION

This invention relates to optical coupling arrangements and, more particularly, to optical coupling arrangements suitable for use in high bandwidth, free-space optical communications systems operating at terra-Hertz (THz) signaling rates.

BACKGROUND OF THE INVENTION

Although the use of fiber optic networks is extensive and growing, laying fiber cable continues to be expensive; especially for the "last mile" connection to a customer's premises. An attractive alternative to cable may be provided by a free-space optical link if sufficient optical power, e.g., at least 100 mW and preferably 1 W or more, can be obtained using an "eye-safe" wavelength in the spectral region between 1.4 and 2-□m. However, at the present time, commercially-available free-space communications transceivers, which utilize modulated diode lasers as transmitters, offer a maximum transmitter modulation rate of only about 650 MHz, which is significantly slower than high-speed fiber optical network data rates of 10 to 40 GHz.

Achieving signaling rates above 650 MHz presents a twofold challenge. First, stray capacitance must be minimized which dictates that solid state detectors have a very small active area, e.g., an aperture of less than 25–30 $\mu$m in diameter. This presents a significant challenge in receiver design since optical signals must be gathered, aligned with and coupled into a very small aperture of the solid state detector surface with minimal loss.

At the outset, it would seem to be quite straight forward to use a lens (or mirror) to focus a light beam down to any desired spot size. To minimize the size of the receiver it is desirable to use a lens with a short focal length. However, to gather the largest column of incident light, it is desirable to select a lens system with the largest possible entrance pupil. This dictates that a lens with a small "f" number (the ratio of focal length to diameter of the entrance pupil) be used. Achieving the small spot size desired (e.g., a diameter of 25–30 □m), limited only by diffraction effects, also dictates that a small "f" number be used. Because lens aberrations, atmospheric turbulence, misalignment, and manufacturing errors all cause the focused spotsize to be much larger than the diffraction-limited size, use of a smaller "f" than that dictated solely by diffraction effects seems unavoidable. On the other hand, lenses with small "f" number are quite expensive and difficult to manufacture.

Heretofore some attempts have been made to use lens systems to address certain aspects of the coupling and alignment problems arising with laser usage. For example, U.S. Pat. No. 6,026,206 discloses an optical coupling arrangement that uses two lenses to compensate for the elliptical beam pattern produced by conventional 980 nm erbium-doped fiber pumped lasers. One lens is disposed at the output of the laser and a second, anamorphic (i.e., a radially non-symmetric) lens is interposed between the conventional lens and the endface of the optical fiber which is to receive the signal. The anamorphic lens converges the fast axis beam with the slow axis beam thereby providing an essentially circular beam. The conventional lens serves to reduce the numerical aperture required of the anamorphic lens.

Another approach is shown in U.S. Pat. No. 5,698,452 in which a trapezoidally tapered waveguide abuts the surface of the photonic detector. The waveguide has a large entrance pupil to gather light which it directs by internal reflection to an exit pupil integrated with the photonic detector.

While the above-mentioned patents addressed some of the coupling and alignment problems presented, they either do not address the desirability of avoiding the need for lenses with especially low "f" numbers or do not show how to provide the high degree of light beam concentration required to achieve terrahertz signaling speeds.

SUMMARY OF THE INVENTION

In accordance with an aspect of the present invention, a cone of incident light is gathered and concentrated to the size of the active area of a photonic detector aperture dimensioned to minimize capacitance effects commensurate with achieving the desired terra-Hertz (THz) signaling speed. The concentration of incident light is effected by the reflective surface contour of compound parabolic concentrator element having focii that define the perimeter of the detector aperture. The compound parabolic concentrator is a non-imaging element having a reflective surface whose contour may be described by rotating a parabolic arc about an axis oriented at an angle to the parabolic arc's axis that is determined by the conical angle of the incident light desired to be gathered. The compound parabolic reflective surface is displaced from the rotational axis at its light gathering end by the radius of the desired entrance pupil and at its light concentration end by the radius of its exit pupil. Fabricating the concentrator element of a light transmitting material having an index of refraction, n, the maximum achievable concentration ratio $C_{max}$ is determined by the squares of the radii of the entrance and exit pupils and the half angle $\theta$ of the maximum cone of incident light to be gathered by:

$$C_{max} = \left(\frac{a}{a'}\right)^2 = \frac{n^2}{\sin^2\theta_{max}}, \quad (1)$$

where, a and a' are the radii of the entrance and exit pupils.

In one embodiment, a refractive lens is employed at the input to the concentrator to focus incident light to as small a spot at the entrance aperture of the concentrator as may be determined by the combined effects of diffraction, lens aberrations, atmospheric turbulence, misalignment, and manufacturing errors. The concentrator element then further concentrates the light and directs it to its exit aperture. In a further embodiment, which facilitates flexible alignment with the photonic detector, the exit aperture of the concentrator may be joined to a finite length of coated, cladded, or un-coated fiber instead of being directly affixed to the detector. In a still further embodiment, the fiber connecting the concentrator to the detector may be arranged to provide pre-amplification ahead of the detector by employing erbium doped fiber amplification (EFDA) using forward and reverse pumping or other gain modes.

BRIEF DESCRIPTION OF THE DRAWING

The foregoing and other objects of the present invention will become more apparent when the following detailed description is read together with the drawing, in which.

GENERAL DESCRIPTION

Figure 1:
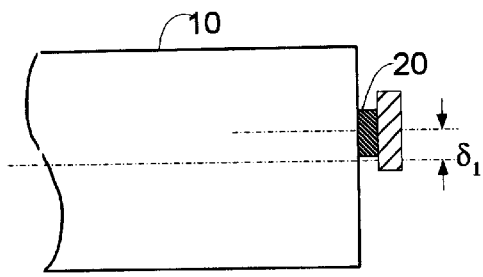
FIG. 1 shows a prior art method of attaching a detector to a light fiber.

FIG. 1 shows a prior art method of aligning a detector 20 to an optical fiber 10 which is performed using an optical bench (not shown). Essentially, the fiber is held on a 5-axis micro-translation stage that is connected to an electronic driver. A light-emitting source is (not shown) is positioned at the left-hand side of fiber 10 and the detector 20 is connected to an electronic feedback measuring circuit (not shown). The electronic driver receives signals from detector 20 and drives the translation stage to optimize the alignment by feeding back commands that improve the alignment. Optimum fiber alignment is realized when the maximum signal power is detected. In a more sophisticated setup, the detector is aligned to give the highest frequency response, which, in turn, is related to how fast the detector can respond to a changing optical signal. Therefore, in general, the feedback electronics is programmed to optimize a series of desired parameters, such as coupling efficiency and detector response, to achieve the best possible performance. Once the fiber is aligned to the detector the detector is permanently glued to the fiber. In practice, this is done by applying a UV curing optical-grade epoxy to the detector face before the fiber is aligned to the detector. Once the fiber-to-detector alignment is complete, a UV source is shone on the interface through the fiber and the epoxy cures. Care must be exercised in choosing an epoxy that does not change the alignment during curing.

Figure 2:
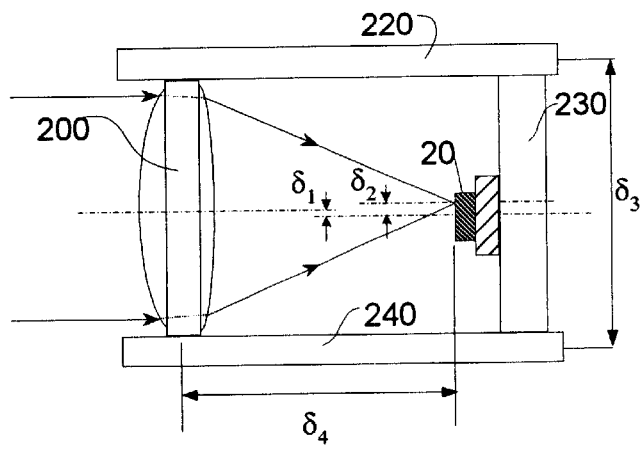
FIG. 2 shows a prior art method of employing a lens in combination with a light fiber and detector.

FIG. 2 shows a prior art method of employing a lens 200 to more sharply focus the light on detector 20 aperture than is possible with the arrangement of FIG. 1. Lens 200 and detector 20 are placed in a housing or frame 220, 230, 240 and are adjusted on an optical bench as in FIG. 1 to achieve the desired alignment. Unfortunately, even after being properly aligned on the optical bench, the frame is subject to vibrations, thermal expansion and contraction, etc. which cause misalignment $\delta_1$, $\delta_2$, $\delta_3$, and $\delta_4$ of the aperture of detector 20 with the focal plane of lens 200. The diameter of lens 200 is much larger than the aperture area of detector 20 in order to gather sufficient light from a distant source. For reasons stated earlier, detector 20 must have a small active aperture area in order to respond to rapidly varying signals. More precisely, lens 200 increases the received signal by a factor proportional to the ratio of the area of the lens to the detector. Of course, this is true only in the case where all the light collected by the lens falls on the active area of detector 20. Ideally, the lens and housing (e.g. receiver system) would be designed to focus all of the received optical power onto the active area of the detector under all operating conditions. As stated previously, this is not a trivial task since several factors conspire to increase the effective area of the focused spot. These factors include: (1) aberrations in the lens; (2) manufacturing errors in the lens, such as decentration, curvature variations, index of refraction variations, etc.; (3) static misalignment of the lens to the detector due to manufacturing errors in the housing and component mounts; (4) dynamic misalignment due to mechanical vibrations, stress, thermal loading, thermal cycling, etc. (5) Signal pointing variations due to atmospheric turbulence and relative transmitter/receiver positional variations (e.g., building swaying, etc.). Therefore, even if we can design and manufacture an affordable lens that focuses the received optical power down to the size of a high-speed detector, it is impractical to use due to all the other effects that conspire to increase the effective size of the focused spot. The solution to this dilemma is at the heart of the invention: to build an inexpensive passive optical extension of the detector that makes it easier to use with external optics; i.e., increase its area without compromising its speed.

Figure 3:
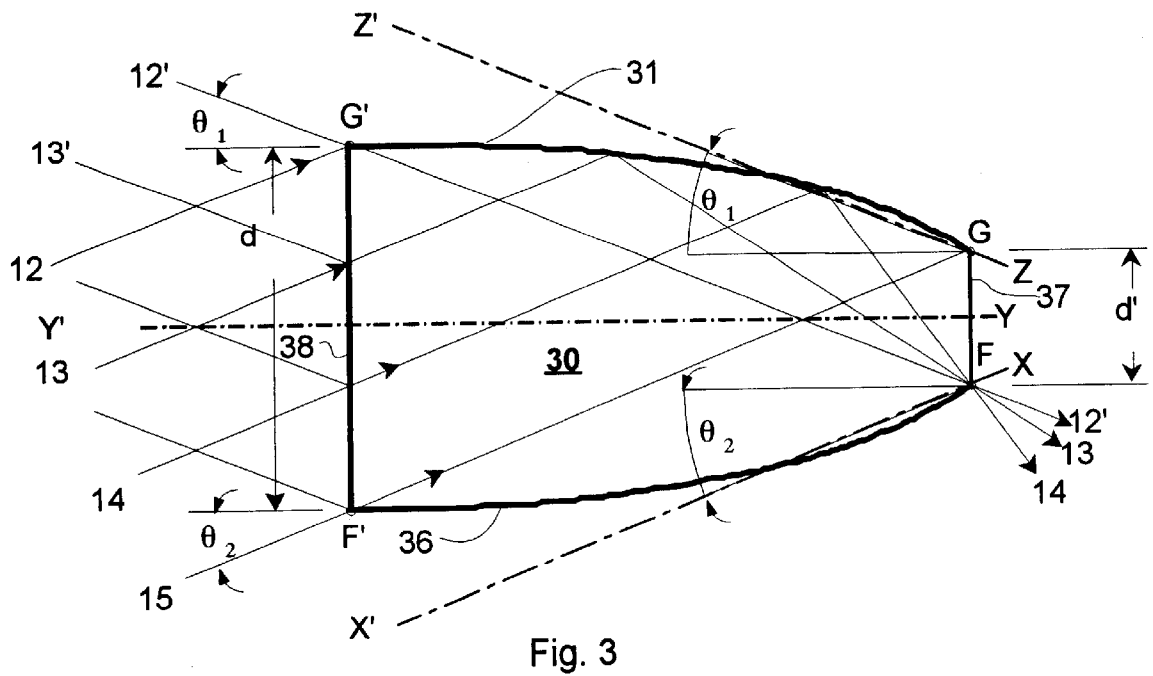
FIG. 3. is a schematic diagram of a non-imaging compound parabolic reflector employed in the invention.

Referring now to FIG. 3, consider a parabolic arc 31 whose axis is X'–X and whose focus is at F. Rays of incident light 12, 13, 14, 15 that are parallel to axis X'–X will strike parabolic arc 31 and be directed to focus F. Let focus F then define one point on the periphery of a proposed exit pupil 37. It is proposed that the diameter d' of exit pupil 37 be not larger than that required to comply with the maximum aperture size of the photonic detector capable of achieving the needed signaling speed. Now locate a point G on arc 10 that is the distance d' from focus F. Next, orient a counterpart parabolic arc 36 passing through focus F having the same curvature as arc 31, but which is oriented so that its focus falls at point G of exit pupil 37. Let Z'–Z be the axis of parabolic arc 36. Make the arc lengths of arcs 31 and 36 sufficient to define an entrance pupil 38 of diameter d so that the ratio d/d' achieves a desired concentration. Let Y'–Y be the axis of symmetry between arcs 31 and 36. If $\theta_2$ is the angle that axis X'–X of arc 31 makes with symmetry axis Y'–Y, then $\theta_2=\theta_1$ is also the angle that axis Z'–Z makes with the axis of symmetry. Therefore, the maximum angle of the cone of light that can be intercepted is $\theta_1+\theta_2=2\theta$. Now let a solid FIG. 30 of light-transmitting material be formed having the compound parabolic curvature defined by arcs 31 and 36 having exit pupil 37 an entrance pupil 38. Solid FIG. 30 may conveniently be called a compound parabolic concentrator, or CPC for short. Note that rays 12', 13' etc., entering pupil 38 at the angle $\theta_1$ to axis Y'–Y and rays 12, 13, etc., entering pupil 38 at the angle $\theta_2$ define the cone angle $2\theta$ of incident light that will be concentrated and be passed to exit pupil 37. All rays that fall within the cone of angle $2\theta$ will, likewise, exit the aperture 37 unimpeded; whereas, rays that enter at an angle greater than $\theta$ will be rejected back and out the entrance pupil 38.

The parametric equation for a parabola arc, such as arc 31, is given by:

$$r = \frac{2f}{1 - \cos\phi}, \quad (2)$$

where r is the radial distance from the focus to arc 31 and $\phi$ is the angle between the parabolic axis and the radial vector. We set the distance r equal to the distance d', the diameter of the exit pupil 37 to be:

$$\frac{2f}{1 - \cos(\pi/2 + \theta)} \quad (3)$$

which can be solved in favor of the focal length to yield f=d'/2(1+sin θ).

The length G'–F of the edge ray 12 that lies within compound parabolic concentrator 30 is likewise found to be:

$$\frac{2f}{1-\cos 2\theta} = \frac{d'(1+\sin\theta)}{2\sin^2\theta} \quad (4)$$

Therefore, in terms of the projection of edge ray G'–F onto the apertures, we find:

$$\frac{d}{2} + \frac{d'}{2}' = \frac{d'(1+\sin\theta)}{\sin\theta} \quad (5)$$

which when solved for the concentration ratio $C_{CPC}$ yields:

$$\left(\frac{d}{d'}\right)^2 = \frac{1}{\sin^2\theta} \quad (6)$$

The same holds true when the compound parabolic element is fabricated out of a dielectric material, with the exception that the concentration ratio increases by a factor of $n^2$, where n is the index of refraction of the dielectric material.

Figure 4:
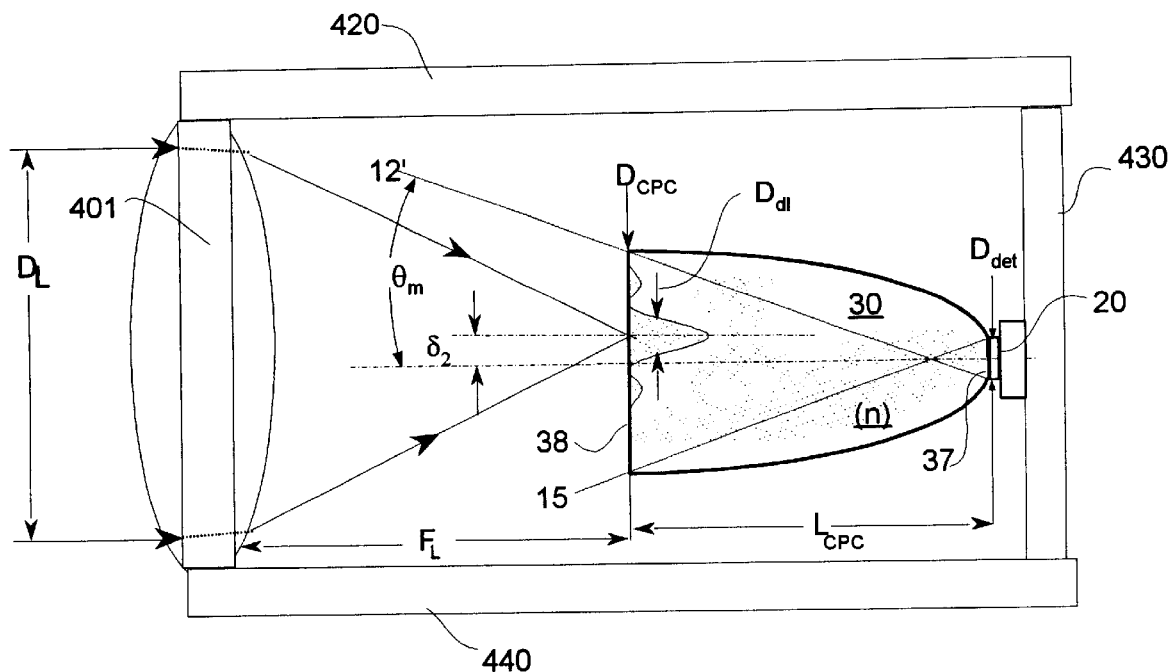
FIG. 4 shows a light gathering arrangement for a high speed optical receiver employing a lens and a non-imaging compound parabolic reflector according to the invention.

FIG. 4 shows one geometry of a high-speed receiver that utilizes a light-transmitting, dielectric-filled compound parabolic concentrator 30 as a light concentrator. Incident light assumed to come from a distant (e.g., >1 km) source (not shown) arrives as substantially parallel rays and is incident upon refractive lens 401. Ideally, lens 401 focuses the incident light to a spot DDL in its focal plane located a distance $F_L$ from lens 401. In accordance with the invention, the focal plane of lens 401 is chosen to lie on the surface of compound parabolic concentrator 30. The minimum size of spot $D_{DL}$ that can be focused by lens 401 is determined by the diffraction limit, given by:

$$D_{DL}=2.44\lambda F_{\#}, \quad (7)$$

where $\lambda$ is the wavelength of the received light, and $$F_{\#} = \frac{F_L}{D_L} \quad (8)$$

is the f-number of the lens, given by the ratio of the focal length to lens diameter.

Ideally, all the light that is incident upon compound parabolic concentrator 30 is directed to the active aperture of detector 20, where it is absorbed and converted into an electronic signal. In order to achieve maximum signaling speed, the spotsize of the focused light must be significantly smaller than the input aperture size $D_{CPC}$ of compound parabolic concentrator 30. Aberration in lens 401, as well as atmospheric turbulence, misalignment, and manufacturing errors, will cause the actual focused spotsize to be much larger than the diffraction-limited spotsize. Therefore, the design rule for the compound parabolic concentrator should be $$D_{CPC} \gg D_{DL} \quad (9)$$

In the preferred embodiment, compound parabolic concentrator 30 should be designed so that all the light is reflected by total internal reflection (TIR) to the detector so that neither reflective surfaces nor coatings are required along the compound parabolic concentrator boundary. The maximum angle allowed for light incident at the entrance pupil which will preserve TIR is $\sin(\theta) \le n-2/n$. The numerical aperture of a lens is $NA=\sin(\theta_{max}) \approx 1/(2F_{\#})$. For the TIR condition to hold, the $F_{\#}$ of the lens must obey the following expression:

$$F_{\#} \ge \left[2\left(n - \frac{2}{n}\right)\right]^{-1} \quad (10)$$

Under this condition, the diameter of the compound parabolic concentrator is related to the detector diameter, $D_{det}$, by the following relationship:

$$D_{CPC}=2nF_{\#}D_{det} \quad (1)$$

Likewise, the length of the compound parabolic concentrator is related to the $F_{\#}$ of the receiver lens and detector diameter by $$L_{CPC}=D_{det}(1+2nF_{\#})F_{\#} \quad (12)$$

These simple equations are all that is required to completely describe the parameters of an ideal high-speed receiver.

Note that in FIG. 4 the alignment problem is considerably eased compared to FIG. 2. In the FIG. 4 embodiment, the detector 20 can be affixed to the CPC 30 using an optical bench (not shown) in the same manner that detector 20 was affixed to fiber 10. However because the maximum cone angle ($2\times\theta_m$) of CPC 30 embraces an area at the entrance pupil 38 that is much larger than the aperture of detector 20 the requirements on focusing lens 401 are much relaxed. For example, the center of focus of lens 401 may deviate from the centerline of the aperture of detector 20 by more than the amount $\delta_2$ and still all of the incident light will be directed to the CPC exit pupil 37 at detector 20 aperture. Of course the materials of which frame members 420, 430, 440 are fabricated should be chosen with regard to dimensional stability with temperture and vibration, but the choice is less stringent than with the prior art lens assembly method of FIG. 2.

EXAMPLE

Consider an optimum compound parabolic concentrator configuration for a 10–12 GHz receiver, which is an order-of-magnitude faster than the current state-of-the-art. It is desirable to select the smallest possible $F_{\#}$ in order to minimize the size of the receiver. Therefore, we will select an $F_{\#}=2$ lens for this idealized example, which is entirely within the capabilities of commercial vendors. We find from Eq. 10 that the index of refraction of the CPC material must be at least $n_{min}=1.545$ in order to satisfy the TIR requirement. The Schott glass BaK1 has an index of refraction of 1.555 at the desired eyesafe wavelength of 1.54-$\mu$m. Therefore, we will choose BaK1 as a prototype material for this particular example. However, any transparent material with an index of refraction that is greater than 1.545 can be used to form a TIR-preserving CPC in combination with a $F_{\#}=2$ lens. Moreover, lower index materials, such as fused silica, can likewise be used to fabricate CPC's in combination with $F_{\#}=2$ lenses; however, not in a TIR mode. In these cases a reflective coating (e.g., gold, aluminum, silver, multi-layer dielectric, etc.) must be applied to the outer walls of the compound parabolic concentrator to effect the required reflection. With $F_{\#}=2$ and n=1.555, the entrance diameter of the compound parabolic concentrator will be $D_{CPC}=156$-$\mu$m, which is 21-times larger than the diffraction-limited spotsize of 7.5-$\mu$m for an $F_{\#}=2$ lens. The length of this particular compound parabolic concentrator is $L_{CPC}=360$-$\mu$m. This compound parabolic concentrator configuration can easily be made by a number of well-known Glens fabrication techniques (e.g., injection molding, grind and polish, diamond turning, etc.).

Alternative Embodiments

The receiver configuration shown in FIG. 4 is the most basic embodiment of this invention. We have considered several other configurations that may be preferable from both a systems and performance point of view. These alternative embodiments are disclosed below.

Fiber Compound Parabolic Concentrator (Fiber CPC)

Figure 5:
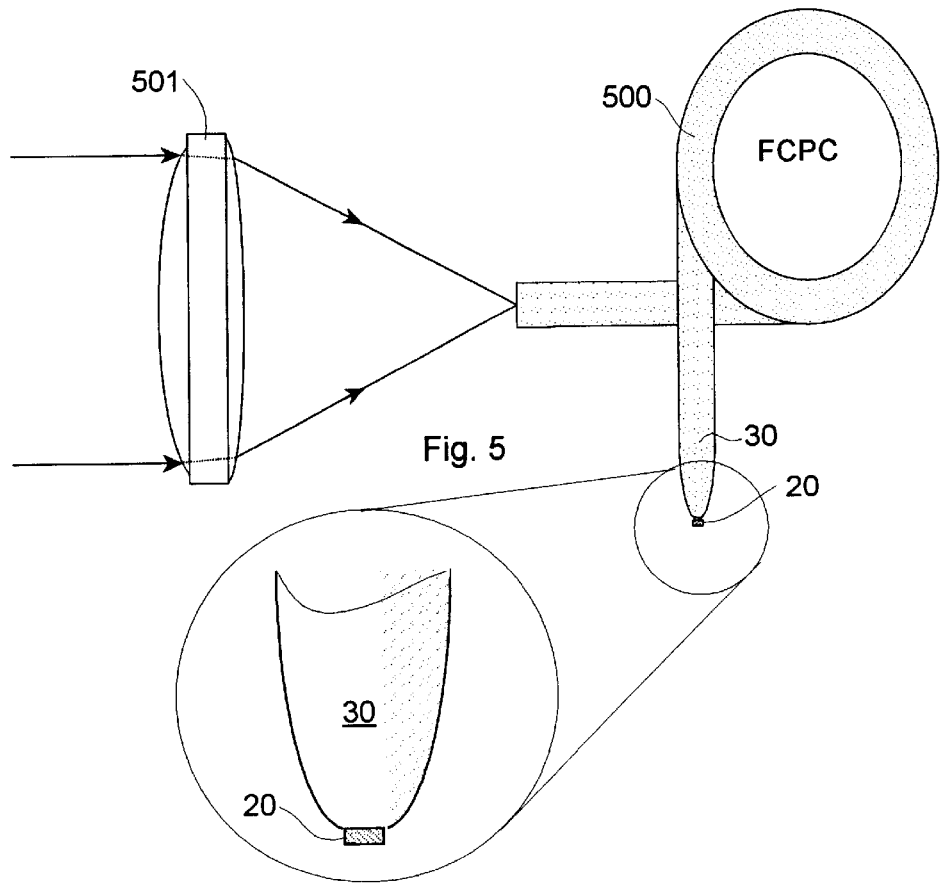
FIG. 5 shows a light gathering arrangement for a high-speed optical receiver in which the concentrator element is integrated with an optical fiber.

One way to improve upon the basic embodiment is to extend the length of the compound parabolic concentrator by adding a cylindrical piece of glass, e.g. an optical fiber, at its entrance pupil. The combined structure, shown in FIG. 5, may be called a fiber-compound parabolic concentrator, or FCPC. This embodiment is useful because the length of the fiber CPC is no longer restricted by the need to axially directly co-align a lens 501 with a detector 20. Indeed, as shown in FIG. 5, the axis of the detector 20 and lens 501 may even be orthogonal. Moreover, while the length of the compound parabolic concentrator for a 10–12 GHz receiver is only 360-$\mu$m long, making it difficult to fabricate, mount, and handle, the fiber CPC eliminates the length restriction. FIG. 5 shows a receiver configuration where the fiber CPC is used to redirect and condense the light from the receiver lens to the detector. The fiber CPC obeys substantially the same design rules as for the compound parabolic concentrator of FIGS. 3 and 4, except that the fiber end is arbitrarily long, limited in practice only by the length-dependent attenuation of the light traveling in the fiber, which is typically not significant until the fiber is several km long.

An improvement to the fiber CPC embodiment may be achieved by utilizing a cladded fiber extension. In this case, the same design rules may be used, with the exception that the NA (numerical aperture) of the fiber extension has to obey the following relationship:

$$NA_f \leq n - \frac{2}{n} \tag{13}$$

where n is the index of refraction of the compound parabolic concentrator. Ideally, the compound parabolic concentrator section of the fiber CPC will be extruded from the fiber itself. In this case the index of the compound parabolic concentrator section is the same as that of the fiber; i.e., n=$n_f$, where $n_f$ is the fiber core index of refraction. The fiber NA is related to the difference between the index of refraction of the fiber core ($n_f$) and the cladding ($n_c$); i.e., $$NA_f = \sqrt{n_f^2 - n_c^2} = n_f\sqrt{2\Delta} \tag{14}$$

where $$\Delta \equiv \frac{n_f - n_c}{n_f}.$$

The only other restriction is that the NA of the receiver lens must be equivalent or smaller than the NA of the fiber; i.e., $$NA_{RL} \leq NA_f \tag{15}$$

where $$NA_{RL} = 1/2F_\#.$$

Active Fiber Compound Parabolic Concentrator

As a further improvement of our invention we have recognized that the fiber CPC (or compound parabolic concentrator) can provide gain for the received optical signal when the material used to make the fiber CPC (or compound parabolic concentrator) is a gain medium, which is pumped by an external pump source (e.g., laser). This configuration has the obvious advantage that a low received signal level is amplified before reaching the detector (i.e., preamplifier). Larger free-space path lengths, non-ideal weather conditions, and reduced transmitter power levels are all enabled when a significant pre-amplification (e.g., 10 to 20 dB) factor is applied to the received signal.

Two common gain modes can be implemented in the fiber CPC (or compound parabolic concentrator): Laser gain using $Er^{3+}$-doped fiber amplifiers (EDFA), or Raman gain. Other gain modes, such an optical parametric amplifier (OPA), and other nonlinear gain mechanisms can likewise be implemented. We recognize that an EDFA is currently the preferred approach since EDFA's are commercially available and they offer high gains (10–20 dB) with low noise figures (<4 dB).

Figure 6:
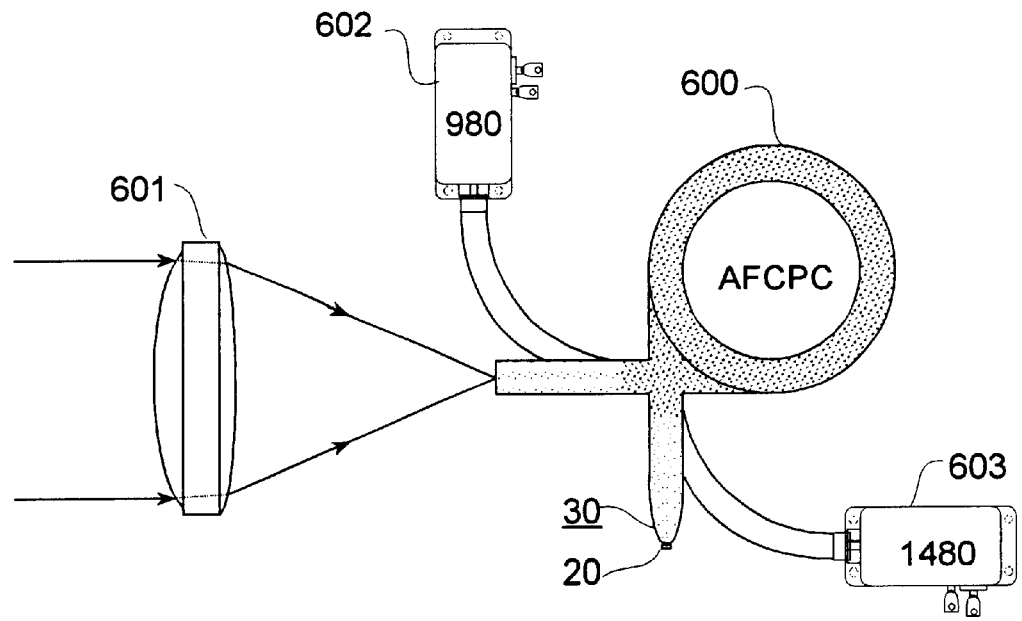
FIG. 6 shows a light gathering arrangement for a high-speed optical receiver in which the optical fiber is doped and pumped.

Lowest noise figure is obtained by forward pumping an EDFA with a 980-nm frequency-stabilized pump source. Further improvements in the gain and power conversion can be realized by adding an additional 1480-mn pump source in the reverse direction (i.e., backward-pumping). These modes are both considered as the preferred method of pre-amplification. FIG. 6 shows this configuration with a forward pump 602 operating at 980 nm and a backward pump 603 operating at 1480-nm. on the active fiber CPC (AFCPC) 600 having a compound parabolic concentrator portion 30 and detector 20. There are several methods of coupling a pump to the active-fiber CPC; however, the preferred method is to use fiber Bragg gratings (FBG), which are often called wavelength-division multiplexers (WDM). We also recognize that other optical elements, such as isolators, taps, and monitors should be used (as is common in the art) to optimize and stabilize the performance of the amplifier.

Figure 7:
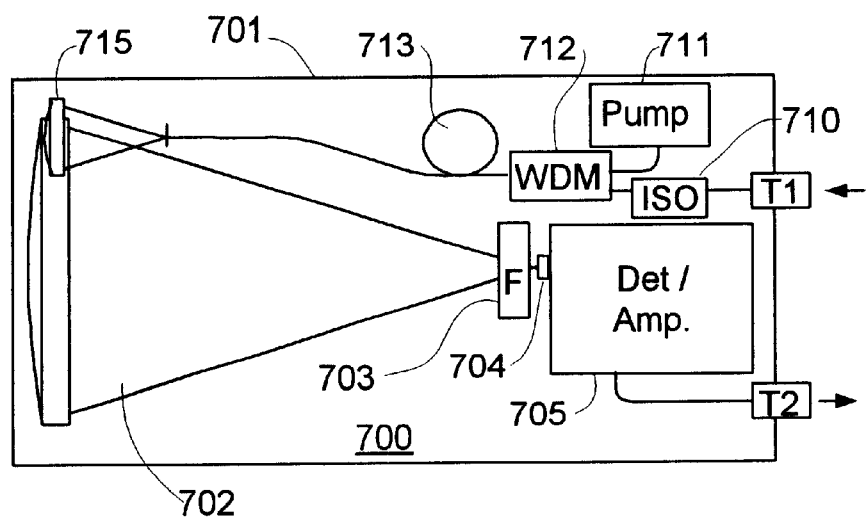
FIG. 7 shows a high-speed optical transceiver arrangement according to the invention.

FIG. 7 shows the layout of a transceiver 700 within an enclosure 701. Low power signals to be transmitted are applied at terminal T1 and via isolator 710 and wave division multiplexer 712 are connected to EDFA 713 leading to transmitting lens 715 which sends a high-power beam at an eye-safe wavelength to the destination. The transceiver transmitter section uses a high power, feedback controlled pump laser 711 driving EDFA 713 to amplify the signal input at terminal T1 to a level that is sufficient to compensate for the range and weather conditions likely to be encountered. Changing weather conditions cause a large variation in the required power transmitted from the EDFA amplifier. The required transmitter power is determined from a measurement of the signal power at the remote destination, which returns a received power indication to receiving lens 702. The signal, incoming from the remote source at the left (not shown) contains within the encoded information a received power indication. This signal passes through primary light gathering element 702 (which may be a lens, mirror, or holographic element), and is applied through optical filter 703 to focus on CPC element 704 at the input of detector amplifier 705. Filter 703 is provided to remove the effects of sunlight, or other optical sources of noise. The received power indication is intercepted and directed to a power control circuit that adjusts the power applied to transmitter laser pump 711 to maintain a predetermined signal to noise (SNR) ratio or bit error rate (BER). The light signal, detected and amplified by 705 is applied to output terminal T2 and sent to the network (not shown).

Through the use of CPC element described above, we have relieved the stringent optical requirements placed on a high-speed transceiver optical system by effectively increasing the diameter of the detector aperture without compromising its speed. By increasing the effective diameter of the detector aperture to that of the entrance pupil of the optical concentrator we are able to relax the manufacturing requirements for the receiver lens, and the opto-mechanical requirements for aligning and maintaining the alignment of the receiver lens to the detector. Our invention leads to a dramatic reduction in the cost of building and maintaining a high-speed transceiver system. In addition, our arrangement reduces such dynamic effects as refractive turbulence, mechanical vibration, and thermal variations that tend to degrade the performance and reliability by causing the signal to wander off the active area of the detector aperture. Our arrangement mitigates these dynamic effects by generating a bigger target for the signal to fall on. It is important to appreciate that our compound parabolic element is more efficient at light gathering than a conventional parabola which can only direct on-axis rays to its focus whereas our element gathers light from a cone angle wider than the entrance pupil. Additional information relating to compound parabolic surfaces may be found in W. T. Welford and R. Winston, *The Optics of Nonimaging Concentrator—Light and Solar Energy*, Academic Press, 1978.

What has been described is deemed to be illustrative of the principles of our invention. Further and other modifications may be made by those skilled in the art without, however, departing from the spirit and scope of the invention.

What is claimed is:

1. A high speed optical receiver comprising:
    a photonic detector having an active aperture area dimensioned to minimize capacitance effects commensurate with achieving the gigahertz signaling speeds; and
    a compound parabolic reflector having a surface contour described by rotating a parabolic arc about a rotational axis, said reflector being a solid element dielectric having a light gathering end with a diameter $D_{CPC}$, a lens at said light gathering end, said element having a predetermined index of refraction n, the detector diameter, $D_{det}$ given by $D_{CPC} = 2 \; n \; F_{\#} D_{det}$, where $F_{\#}$ is the reciprocal of twice the numerical aperture of the lens, the axis of said parabolic arc making an angle with said rotational axis proportional to the maximum conical angle of the incident light to be gathered, said reflector having a plurality of focii defining the perimeter of an exit pupil not exceeding the active area of said photonic detector aperture.

2. A high-speed optical receiver according to claim 1 further comprising an optical fiber coupling said lens to the light gathering end of said photonic detector.

3. A high-speed optical receiver according to claim 2 wherein the surface of solid element is formed on said optical fiber.

4. A high speed optical receiver according to claim 2 wherein said optical fiber is coated or imbedded in a lower-index cladding.

5. A high-speed optical receiver according to claims 2 wherein said fiber element is erbium doped.

6. A high-speed optical receiver according to claim 2 wherein said fiber element is counter-pumped.

7. A high-speed optical receiver according to claim 2 wherein the ratio of the squares of the radii of said entrance and exit pupils is not larger than:

$$C_{\max} = \left(\frac{a}{a'}\right)^2 = \frac{n^2}{\sin^2 \theta_{\max}},$$

where, n is the index of refraction of the concentrator element; a and a' are the radii of the entrance and exit pupils; and $\theta_{max}$ is half the cone angle of incident light.

8. An optical coupler having an exit pupil for directing light to a photonic detector having an active aperture dimensioned to minimize capacitance at gigahertz signaling speeds, comprising:
    a light transmitting element having a reflective surface for directing incident light to said detector aperture, said reflective surface being defined by a parabolic arc rotated about an axis of rotation which is oriented at an angle to the arc's parabolic axis that is substantially equal to half the conical angle of the maximum incident light desired to be gathered, said arc being radially displaced from said rotational axis at its light gathering end by the radius of the desired entrance pupil and displaced from said rotational axis at its other end by the radius of said detector aperture, the ratio of the squares of the diameters of said entrance and exit apertures being substantially $$C_{\max} = \left(\frac{a}{a'}\right)^2 = \frac{n^2}{\sin^2 \theta_{\max}},$$

where,
    n is the index of refraction of the concentrator element; and $q_{max}$ is half the maximum cone angle of incident light whereby all light incident at said light gathering end that is within a cone of angle $2\theta \leq 2\theta_{max}$ is directed towards the detector, and all light that falls outside the angle $2\theta_{max}$ is rejected back towards the source, said angle $2\theta_{max}$ defining the "acceptance" angle of said optical coupler.

9. An optical coupler according to claim 2, wherein said coupler has an F number given by:

$$F_{\#} \geq \left[2\left(n - \frac{2}{n}\right)\right]^{-1},$$

where n is the index of refraction of said element.

* * * * *